US011579250B2

(12) United States Patent
Parikh et al.

(10) Patent No.: US 11,579,250 B2
(45) Date of Patent: Feb. 14, 2023

(54) LANE BOUNDARY DETECTION USING RADAR SIGNATURE TRACE DATA

(71) Applicant: Robert Bosch GmbH, Stuttgart (DE)

(72) Inventors: Sameer Parikh, Novi, MI (US);
Alireza Nemati, Novi, MI (US);
Krishna Chinni, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 240 days.

(21) Appl. No.: 17/132,557

(22) Filed: Dec. 23, 2020

(65) Prior Publication Data

US 2022/0196797 A1 Jun. 23, 2022

(51) Int. Cl.
| G01S 7/41 | (2006.01) |
| G01S 13/52 | (2006.01) |
| B60W 60/00 | (2020.01) |
| B60W 40/072 | (2012.01) |
| G01C 21/00 | (2006.01) |
| G01S 19/42 | (2010.01) |

(52) U.S. Cl.
CPC ........... *G01S 7/415* (2013.01); *B60W 40/072* (2013.01); *B60W 60/001* (2020.02); *G01C 21/3885* (2020.08); *G01S 13/52* (2013.01); *B60W 2420/42* (2013.01); *B60W 2420/52* (2013.01); *B60W 2552/10* (2020.02); *B60W 2556/50* (2020.02); *G01S 19/42* (2013.01)

(58) Field of Classification Search
CPC .......... G01S 7/415; G01S 13/52; G01S 19/42; B60W 60/001; B60W 40/072; B60W 2556/50; B60W 2552/10; B60W 2420/42; B60W 2420/52; G01C 21/3885
See application file for complete search history.

(56) References Cited

U.S. PATENT DOCUMENTS

| 8,370,023 | B2 * | 2/2013 | Maass | ................ B62D 15/025 |
| | | | | 701/41 |
| 9,278,712 | B2 * | 3/2016 | Buerkle | ................... B62D 1/28 |
| 11,173,957 | B2 * | 11/2021 | Nagae | ................... B60W 30/12 |
| 2007/0225907 | A1 * | 9/2007 | Oonishi | ............. G01C 21/3602 |
| | | | | 701/411 |
| 2020/0010113 | A1 * | 1/2020 | Watari | ..................... B62D 6/04 |
| 2020/0124422 | A1 * | 4/2020 | Lin Sörstedt | ........ G05D 1/0274 |

FOREIGN PATENT DOCUMENTS

| CN | 109254289 | A | * | 1/2019 | ........... G01S 13/931 |
| GB | 2552940 | A | * | 2/2018 | ............ B60W 10/20 |
| JP | 2008012975 | A | * | 1/2008 | .......... B60W 30/143 |
| JP | 2010151691 | A | * | 7/2010 | |
| JP | 201218867 | | | 6/2012 | |
| JP | 2012168884 | | | 9/2012 | |
| JP | 2020020665 | A | * | 2/2020 | ............ B60W 30/14 |
| WO | WO-2009103692 | A1 | * | 8/2009 | ......... B60R 21/0134 |

* cited by examiner

*Primary Examiner* — Peter D Nolan
*Assistant Examiner* — Kenneth M Dunne
(74) *Attorney, Agent, or Firm* — David Kovacek; Maginot, Moore & Beck LLP

(57) ABSTRACT

A system, method, and computer-readable medium having instructions stored thereon to enable an ego vehicle having an autonomous driving function to estimate and traverse a curved segment of highway utilizing radar sensor data. The radar sensor data may comprise stationary reflections and moving reflections. The ego vehicle may utilize other data, such as global positioning system data, for the estimation and traversal. The estimation of the curvature may be refined based upon a lookup table or a deep neural network.

20 Claims, 7 Drawing Sheets

| Radius of Curve | Lane Position | Curve Direction | Curve Position | Distance to Left Boundary | Distance to Right Boundary |
|---|---|---|---|---|---|
| 250-300m | Rightmost | Right | Entry | 0.7m | 0.2m |
| 250-300m | Rightmost | Right | Middle | 0.6m | 0.3m |
| 250-300m | Rightmost | Right | Egress | 0.5m | 0.4m |
| 250-300m | Leftmost | Left | Entry | 0.2m | 0.7m |
| ... | ... | ... | ... | ... | ... |

Fig. 5

LANE BOUNDARY DETECTION USING RADAR SIGNATURE TRACE DATA

TECHNICAL FIELD

This disclosure relates to radar-based mapping and utilizing of radar data to improve autonomous driving functions of vehicles.

BACKGROUND

Radar-based mapping functions improve the operations of a vehicle with respect to driver assistance or autonomous vehicle functions. Radar sensors are more common in modern vehicles than other forms of sensors, and thus it is desired to utilize radar data to improve reliable and safe operation of driver assistance functions. In particular, determination of lane boundaries is very difficult using radar data alone, as lane boundaries are easiest to detect using optical sensors. What is desired is a method and system for extrapolating lane boundaries from radar data.

SUMMARY

One aspect of this disclosure is directed to a method for navigating a vehicle having an autonomous driving function through a curved segment of a highway. The method may comprise capturing sensor data from a sensor, such as a radar sensor, associated with the vehicle. The sensor data may comprise stationary reflection (SR) data indicating stationary objects and moving reflection (MR) data indicating moving objects. The method may further comprise estimating a width of a driving surface of the highway based on the SR data, estimating a curve radius of the highway based upon the sensor data and the width of the driving surface, generating an estimated radar signature trace (RST) indicating a traversal curve for the vehicle to navigate, generating a lane position of the vehicle with respect to the highway, and generating a refined RST based upon the sensor data, lane position, curve radius, and a lookup table of road curvature data. Once the refined RST is generated, the method may comprise navigating the vehicle along the refined RST through the curved segment of the highway.

Another aspect of this disclosure is directed to a non-transitory computer-readable medium having instructions stored thereon that when executed by a processor associated with a vehicle having an autonomous driving function cause the processor to perform a method for navigating the vehicle through a curved segment of a highway. The method may comprise capturing sensor data from a sensor, such as a radar sensor, associated with the vehicle. The sensor data may comprise station reflection (SR) data indicating stationary objects and moving reflection (MR) data indicating moving objects. The method may further comprise estimating a width of a driving surface of the highway based on the SR data, estimating a curve radius of the highway based upon the sensor data and the width of the driving surface, generating an estimated radar signature trace (RST) indicating a traversal curve for the vehicle to navigate, generating a lane position of the vehicle with respect to the highway, and generating a refined RST based upon the sensor data, lane position, curve radius, and a lookup table of road curvature data. Once the refined RST is generated, the method may comprise navigating the vehicle along the refined RST through the curved segment of the highway.

A further aspect of this disclosure is directed to a vehicle navigation system associated with a vehicle having an autonomous driving function. The system may comprise a radar sensor operable to capture sensor data comprising stationary reflection (SR) data indicating the location of stationary objects with respect to the vehicle and moving reflection (MR) data indicating the location of moving objects with respect to the vehicle. The system may further comprise a process, a global positioning system (GPS) sensor associated with the vehicle and in data communication with the processor, and a memory in data communication with the processor. The memory may comprise processor-executable instructions which, when executed by the processor, cause the processor to navigate the vehicle through a curved segment of a highway. The instructions may comprise the steps of estimating a width of a driving surface of the highway based on the SR data, estimating a curve radius of the highway based upon the sensor data and the width of the driving surface, generating an estimated radar signature trace (RST) based upon the sensor data, generating a lane position of the vehicle based upon the SR data, GPS data, and high-density map data representing highways, generating a refined RST based upon the sensor data, lane position, curve radius, and a lookup table of road curvature data stored on the memory, and navigating the vehicle along the refined RST of the extent of the curved segment of highway.

Another aspect of this disclosure is directed to a method for navigating a vehicle having an autonomous driving function through a curved segment of a highway. The method may comprise capturing sensor data from a sensor, such as a radar sensor, associated with the vehicle. The sensor data may comprise station reflection (SR) data indicating stationary objects and moving reflection (MR) data indicating moving objects. The method may further comprise estimating a curve radius of the highway based upon the sensor data generating an estimated radar signature trace (RST) indicating a traversal curve for the vehicle to navigate, generating a lane position of the vehicle with respect to the highway from a deep neural network based on the SR data and generating a refined RST based upon the sensor data, lane position, curve radius, and the deep neural network. Once the refined RST is generated, the method may comprise navigating the vehicle along the refined RST through the curved segment of the highway.

Another aspect of this disclosure is directed to a non-transitory computer-readable medium having instructions stored thereon that when executed by a processor associated with a vehicle having an autonomous driving function cause the processor to perform a method for navigating the vehicle through a curved segment of a highway. The method may comprise capturing sensor data from a sensor, such as a radar sensor, associated with the vehicle. The sensor data may comprise station reflection (SR) data indicating stationary objects and moving reflection (MR) data indicating moving objects. The method may further comprise estimating a curve radius of the highway based upon the sensor data, generating an estimated radar signature trace (RST) indicating a traversal curve for the vehicle to navigate, generating a lane position of the vehicle with respect to the highway from a deep neural network based on the SR data, and generating a refined RST based upon the sensor data, lane position, curve radius, and the deep neural network. Once the refined RST is generated, the method may comprise navigating the vehicle along the refined RST through the curved segment of the highway.

A further aspect of this disclosure is directed to a vehicle navigation system associated with a vehicle having an autonomous driving function. The system may comprise a radar sensor operable to capture sensor data comprising stationary reflection (SR) data indicating the location of stationary objects with respect to the vehicle and moving reflection (MR) data indicating the location of moving objects with respect to the vehicle. The system may further comprise a process, a global positioning system (GPS) sensor associated with the vehicle and in data communication with the processor, and a memory in data communication with the processor. The memory may comprise processor-executable instructions which, when executed by the processor, cause the processor to navigate the vehicle through a curved segment of a highway. The instructions may comprise the steps of estimating a curve radius of the highway based upon the sensor data and the width of the driving surface, generating an estimated radar signature trace (RST) based upon the sensor data, generating a lane position of the vehicle based upon the SR data and a deep neural network trained on a historical corpus of historical SR data and historical lane data, generating a refined RST based upon the sensor data, lane position, curve radius, and the deep neural network, and navigating the vehicle along the refined RST of the extent of the curved segment of highway.

The above aspects of this disclosure and other aspects will be explained in greater detail below with reference to the attached drawings.

BRIEF DESCRIPTION OF THE DRAWINGS

FIG. 5 is an example subset of data found in a lookup table useful for generating a radar signature trace path on a curved segment of highway.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
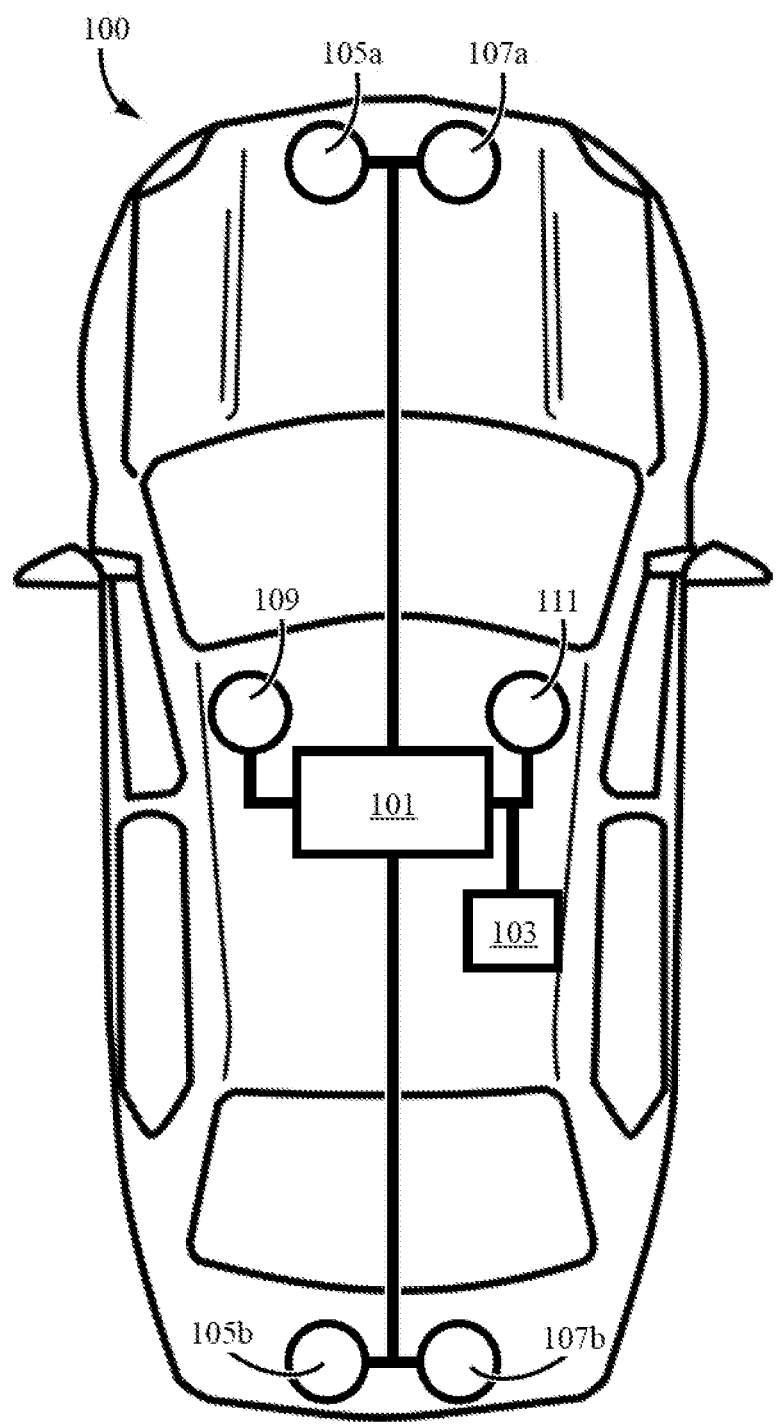
FIG. 1 is a diagrammatic illustration of a vehicle having an autonomous driving function.

FIG. 1 is a diagrammatic illustration of a vehicle 100 having an autonomous driving function via a processor 101. Processor 101 may be configured to control functions and components of vehicle 100. The autonomous driving function of vehicle 100 may comprise a fully autonomous driving mode, one or more advanced driver assistance functions, or may optionally select between modes. In some embodiments of vehicle 100, the autonomous driving function may be disable at the discretion of an operator without deviating from the teachings disclosed herein.

In the depicted embodiment, processor 100 comprises a processing device associated with vehicle 100 and permanently installed within the vehicle. However, in other embodiments, processor 100 may be embodied as a mobile processing device, a smartphone, a tablet computer, a laptop computer, a wearable computing device, a desktop computer, a personal digital assistant (PDA) device, a handheld processor device, a specialized processor device, a system of processors distributed across a network, a system of processors configured in wired or wireless communication, or any other alternative embodiment known to one of ordinary skill in the art.

Processor 101 is in data communication with a number of components of vehicle 100, and may utilize this data communication to acquire data necessary to safely and successfully execute functions of the vehicle, or may use the data communication to exert direct control of one or more of the components. A memory 103 may be associated with vehicle 100 and in data communication with processor 101. Memory 103 may provide instructions for the processor 101 to execute, such the instructions for the processor to successfully control the autonomous function or functions of vehicle 100. Memory 103 may also comprise data storage or provide data to processor 101 to utilize in operation.

In the depicted embodiment, memory 103 may comprise embedded memory associated with vehicle 100 and installed therein. However, in other embodiments, memory 103 may be embodied as a non-transitory computer-readable storage medium or a machine-readable medium for carrying or having computer-executable instructions or data structures stored thereon. Such non-transitory computer-readable storage media or machine-readable medium may be any available media embodied in a hardware or physical form that can be accessed by a general purpose or special purpose computer. By way of example, and not limitation, such non-transitory computer-readable storage media or machine-readable medium may comprise random-access memory (RAM), read-only memory (ROM), electrically erasable programmable read-only memory (EEPROM), optical disc storage, magnetic disk storage, linear magnetic data storage, magnetic storage devices, flash memory, or any other medium which can be used to carry or store desired program code means in the form of computer-executable instructions or data structures. Combinations of the above should also be included within the scope of the non-transitory computer-readable storage media or machine-readable medium.

Processor 101 may be in additional data communication with a number of sensors operable to provide measurements indicating conditions of the vehicle 100, or the surroundings of the vehicle during operation. In the depicted embodiment, vehicle 100 comprises a number of sensors including radar sensors 105, camera sensors 107, and a global positioning system (GPS) system 109. In the depicted embodiment, vehicle 100 comprises multiple radar sensors 105a and 105b arranged at the front and rear of the vehicle, but other embodiments may have a different number of radar sensors or a different arrangement of radar sensors without deviating from the teachings disclosed herein. Radar sensors 105 may be operable to measure radar sensor data indicating the position of moving and stationary objects relative to vehicle 100. Radar sensors 105 may be configured to emit a radar signal and generate sensor data indicating the relative time and directionality of reflections of the radar signal to indicate objects within the environment. The sensor data may be compiled across iterative radar transmissions and detections to provide a more complete and robust imagining of the environment. Such sensor data may be classified based upon the detection of movement of the measured objects within the environment. Measurements indicating a moving object are classified as moving reflection (MR) data. Measurements indicating a stationary object are classified as stationary reflection (SR) data. Analysis of the sensor data may be completed, such as by processor 101, in view of the current moving speed of vehicle 100 to provide an assessment of the motion of detected objects relative to the instant position and motion of vehicle 100. In some such embodiments, processor 101 may utilize data received from a speedometer or other instrument configured to generate speed data reflective of the moving speed of vehicle 100 to accomplish the classification of MR data and SR data.

In the depicted embodiment, vehicle 100 comprises multiple camera sensors 107a and 107b arranged at the front and rear of the vehicle, but other embodiments may have a different number of camera sensors or a different arrangement of camera sensors without deviating from the teachings disclosed herein. Camera sensors 107 may provide redundant sensor data in a different form that can be analyzed to detect objects within the environment. Such redundant measurements may be utilized to improve the accuracy and reliability of object detection with respect to vehicle 100. Camera sensors 107 may additionally advantageously be utilized to detect features of the environment that are not easily detected or measured using radar data, or using radar data alone. In some embodiments, camera sensors 107 may be utilized to detect lane boundaries on the surface of a highway, identify text or numerals within signage, or to assist in an object identification function of detected objects without deviating from the teachings disclosed herein. Other utility for camera data may be recognized by those of ordinary skill without deviating from the teachings disclosed herein. Some embodiments may not comprise camera sensors 107 without deviating from the teachings disclosed herein.

GPS sensor 109 may be operable to measure a global location of vehicle 100 and generate GPS data comprising GPS coordinates indicating such a position. GPS sensor 109 may provide this GPS data to processor 101 to assist in executing functions of the processor or other functions of vehicle 100 controlled by processor 101. Some embodiments may have a different number or arrangement of GPS sensors 109 without deviating from the teachings disclosed herein. Some embodiments may utilize other localization protocols than GPS to provide localization data describing the location of vehicle 100 without deviating from the teachings disclosed herein. Some embodiments may not have a GPS sensor 109 or functional equivalent without deviating from the teachings disclosed herein.

In some instances, it may be advantageous for processor 101 to be in communications with devices external to vehicle 100. Such communications may be utilized to deliver data describing vehicle 100 to an external device, or to acquire data from external sources that may be utilized in the operations of vehicle 100. To accommodate such communications between processor 101 and external devices, vehicle 100 may further comprise a wireless transceiver 111 in data communication with processor 101.

Wireless transceiver 111 may be configured to communicate wirelessly via one or more of an RF (radio frequency) specification, cellular phone channels (analog or digital), cellular data channels, a Bluetooth specification, a Wi-Fi specification, a satellite transceiver specification, infrared transmission, a Zigbee specification, Local Area Network (LAN), Wireless Local Area Network (WLAN), or any other alternative configuration, protocol, or standard known to one of ordinary skill in the art. In the depicted embodiment, wireless transceiver 111 comprises a single device that is operable to send data to and receive data from external sources wirelessly, but other embodiments may comprise distinct components acting as a transmitter and a receiver respectively without deviating from the teachings disclosed herein. Other embodiments may comprise a different arrangement or number of transceivers, transmitters, or receivers without deviating from the teachings disclosed herein.

Vehicle 100 may comprise a number of autonomous driving functions. Such functions may advantageously have improved safety and reliability if operated with additional knowledge about the vehicle 100 or the operating environment. One example of desirable additional knowledge may be the position of the boundaries of a highway surface upon which the vehicle 100 is operating. Another example of desirable knowledge may be the position of any lane boundaries defined upon a surface of a highway upon which the vehicle 100 is operating. Because of the relative affordability and prevalence of radar sensors, it would be advantageous to extrapolate the boundaries of the highway and any associated lane boundaries utilizing radar sensors.

Figure 2:
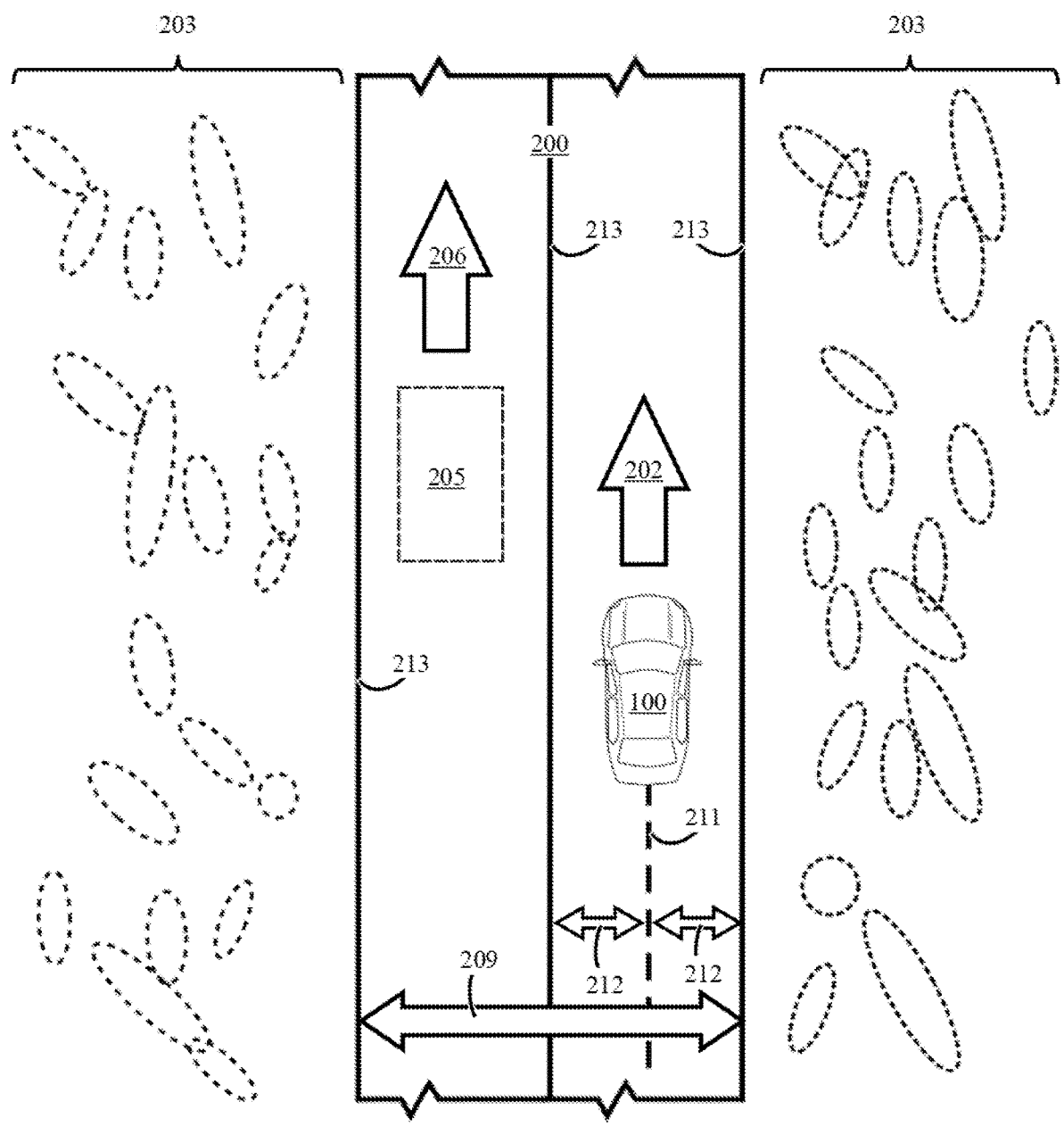
FIG. 2 is a diagrammatic illustration of a vehicle determining a radar signature trace path on a straight segment of a highway.

FIG. 2 is a diagrammatic illustration of a vehicle 100 acting as a so-called "ego vehicle" in an operation to determine the boundaries of a highway road surface 200 using radar reflection data. In the depicted operation, vehicle 100 is moving along road surface 200 in an ego direction 202 at an arbitrary (but known) speed. When in motion or while stopped, the sensors of vehicle 100 (such as radar sensors 105, see FIG. 1) may be utilized to detect stationary and moving objects based upon reflections. In the depicted illustration, stationary objects are indicated by stationary reflections (SR) 203 which are measured by the sensors of vehicle 100 to generate SR data. In the depicted illustration, moving objects are indicated by moving reflections (MR) 205 which are measured by the sensors of vehicle 100 to generate MR data. The relative position of objects with respect to vehicle 100 may be determined after multiple measurements by the sensors. When such measurements are made in view of the active speed of vehicle 100, it may be determined which of the reflections are SR and which of the reflections are MR.

In the depicted illustration, MR 205 may be determined to be traveling in an MR direction 206. In some embodiments, the system may utilize MR data to assess the likelihood that MR 205 corresponds to another vehicle on the road, or another moving object utilizing the roadway, such as a motorcycle, bicycle, or pedestrian. This assessment may be based upon the detected size of the object indicated by the MR data, and also be estimating the relative speed of the moving object or objects that are responsible for the proliferation of MR 205.

In the depicted illustration, vehicle 100 may utilize the sensor data to make generate a road estimation 209 indicating an estimated width of a drivable surface of the road. In the depicted embodiment, this estimation may utilize both SR data and MR data, but in some embodiments only SR data may be utilized. In such embodiments, the road estimation 209 may be predicated on an assumption that there will no substantial objects within the width of the highway, and thus the SR data is understood only to correspond to objects placed only on surfaces in the proximity of the road where it is not legal to drive, such as the shoulder.

In the depicted illustration, vehicle 100 may utilize the sensor data to generate a radar signature trace (RST) 211, providing an estimated path of traversal along the highway for the vehicle 100 to maneuver. The RST 211 should desirably keep the vehicle 100 on the drivable surface of the highway and making progress in a desired direction, such as ego direction 202. In the depicted embodiment, the road surface 200 may comprise multiple lanes, and the processor 101 (see FIG. 1) may perform a series of calculations to determine how many lanes are expected for a highway of estimated width 209. The expected number of lanes for a highway may be determined utilizing data indicating highway regulations of the immediate vicinity, such as regulations defining required road widths and lane widths. In some embodiments, processor 101 may acquire additional data to assist in determining the number of lanes present in the immediate vicinity. Such data may comprise, for example, GPS coordinates acquired by GPS sensor 109 (see FIG. 1) and high-density map data. The GPS coordinates may be cross-referenced with the high-density map data to determine an expected number of lanes for vehicle 100 to observe in the instant location. The high-density map data may be locally stored, such as on memory 103, or may be acquired from an external source via wireless transceiver 111.

After a number of expected lanes is determined, RST 211 may be generated in view of the expected number of lanes, and may utilize lane estimations 212 to help position RST 211 within the legal bounds of an estimated lane position. Such positioning of the RST 211 may advantageously improve the likelihood that vehicle 100 will remain within the legal bounds of a lane (and within the legal bounds of road surface 200) when traversing RST 211.

In the illustration of FIG. 2, road surface 200 comprises a relatively straight section of highway. A straight section of highway may advantageously provide very accurate estimations of road surface 200 because the SR data may indicate a correspondingly straight and regular distance from the edges of road surface 200. Thus, in a straight section of highway, processor 101 may be able to utilize the sensor data, and even rely upon SR data primarily, to generate relatively accurate estimated lane boundaries 213. Notably, in sections of road that are understood to comprise only a single lane, the lane boundaries 213 may indicate the legal boundaries for the driving surface of the highway.

Figure 3:
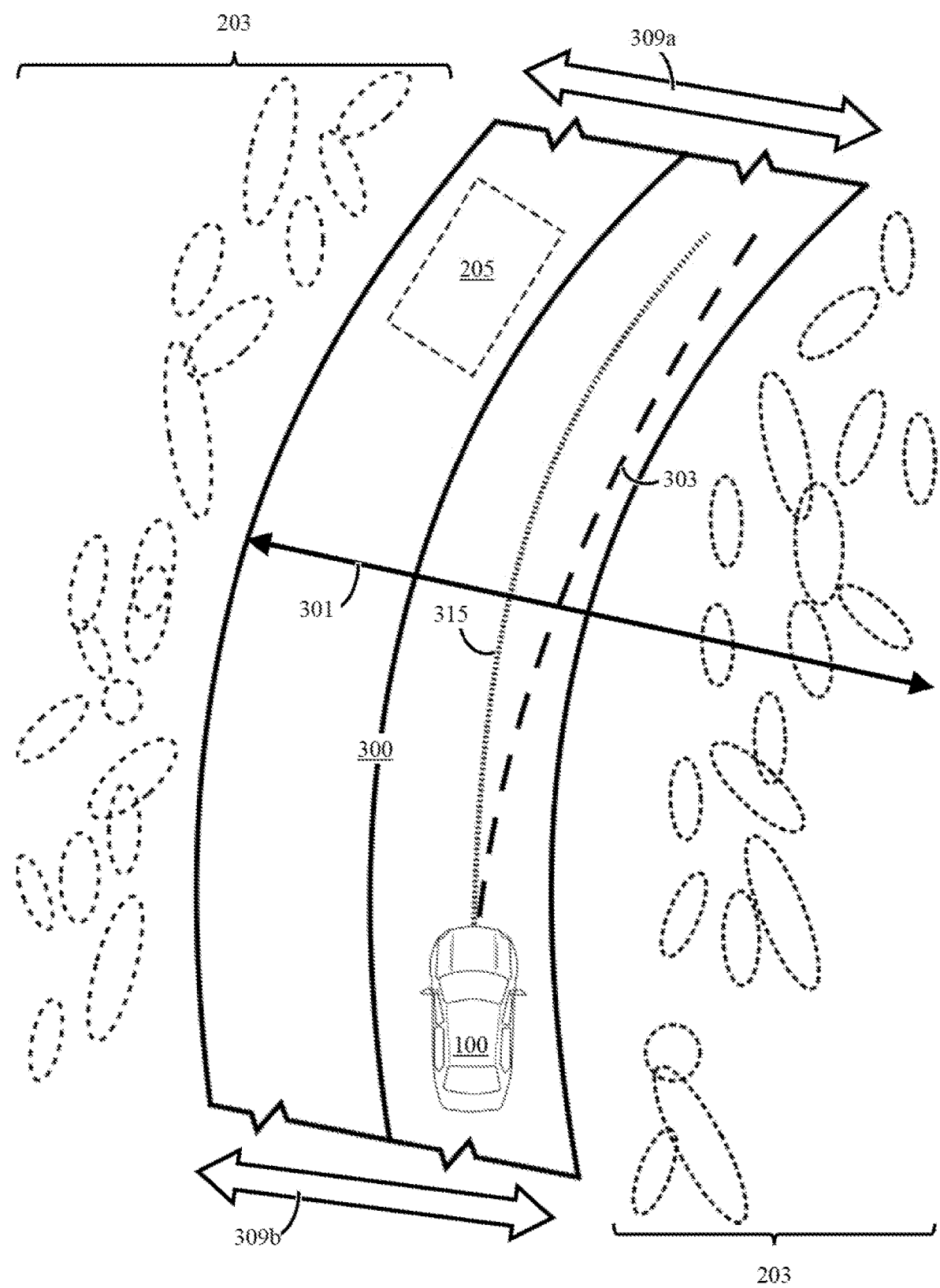
FIG. 3 is a diagrammatic illustration of a vehicle determining a radar signature trace path on a curved segment of a highway.

FIG. 3 provides a diagrammatic illustration of a different road surface 300 in which comprises a more complicated environment for developing an RST in the form of a curved section of highway. In this depicted illustration, the SR 203 are not position at regular and even distances from the edges of a straight road surface 300, in part because road surface 300 curves m a manner consistent with a curve radius 301. In such embodiments, processor 101 (see FIG. 1) may generate an estimated RST 303 that does not successfully create a trajectory that vehicle 100 may follow that successfully contains the vehicle within the legal boundaries of the road surface.

Processor 101 may utilize additional data analysis to refill the trajectory of RST 303. For example, in some embodiments processor 101 may utilize MR 205 to measure how the object producing the reflections traverses the curvature of the road. The reflections within MR 205 may be compiled as MR data that can be utilized to generate a RST associated with MR 205 (not shown). However, while utilization of MR data may be useful to refine the estimated RST 303, reliance, upon this data is not preferred for at least two reasons. Firstly, it is possible, and in some instances likely, that no MR data will be available because no other moving objects are in the vicinity of vehicle 100. Secondly, the motion of objects indicated by MR data may itself not conform exactly to the curve of road surface 300. For example, MR 205 may correspond to another vehicle being driven by a human driver that has a tendency to "cut the curve" of turns necessary to stay on the driving surface of the road, and therefore the associated vehicle may not reliably stay within the lanes itself. In other instances, MR 205 may correspond to other moving objects that are not conforming to the lane boundaries on purpose, such as during a lane change maneuver. In any such instances, it is still desired for the "ego" vehicle 100 to remain within the bounds of its own lane.

These challenges may be overcome by taking into account a curve radius 301 of the road surface 300. Curve radius 301 expresses the radius of an arc exhibiting the same curve as road surface 300. Curve radius 301 may advantageously be calculated utilizing SR data alone. In the depicted embodiment, the SR 203 may be measured at various points along road surface 300 to determine estimated widths 309 of road surface 300 at each instantaneous point of measurement. In the depicted example, the SR data may be utilized to estimate an orientation of each of the estimated widths 309 as well. The estimated widths and orientation of the road can then be compared to known dimensions of regulated road construction to estimate curve radius 301. Other data may be utilized to assist in the estimation of curve radius 301, such as high-density map data of the road based upon GPS data. GPS data may be acquired by a GPS sensor, such as GPS sensor 109 (see FIG. 1). The high-density map data may be stored in a memory local to vehicle 100, such as memory 103 (see FIG. 1), or may be acquired from an external source. Other embodiments may, estimate curve radius 301 utilizing different techniques without deviating from the teachings disclosed herein.

Utilizing the SR data and curve radius 301, vehicle 100 may generate a refined RST 315 that provides a path to traverse road surface 300 through the curved segment of the highway. Refined RST 315 may be generated by utilizing additional information, such as MR data, other RSTs corresponding to the MR data, GPS data, or any other data recognized by one of ordinary skill in the art to improve the accuracy of the refined RST 315 without deviating from the teachings disclosed herein.

Vehicle 100 may be configured to utilize one of several techniques to generate a refined RST 315 and successfully navigate the generated RST. In some embodiments, an ego vehicle 100 may utilize data from a lookup table comprising historical data of successful turns on roads having similar dimensions and configurations as the instant road being traversed by the ego vehicle. In such embodiments, the lookup table may be populated with RST data derived from previously-captured SR data. The lookup table may additionally be populated based upon additional data, such as MR data or visually-confirmed optical data describing successful RSTs through curved segments of highways. The optical data may be acquired using optical measuring devices, such as camera sensors 107 (see FIG. 1). In such embodiments, an ego vehicle 100 having both radar sensors 105 and camera sensors 107 may generate corresponding data from each type of sensor and provide the data to external processors to continuously improve the populated data of the lookup table. However, in some embodiments, the lookup table may remain static once populated, or may instead be updated in a regular (but non-continuous) fashion without deviating from the teachings disclosed herein.

Figure 4:
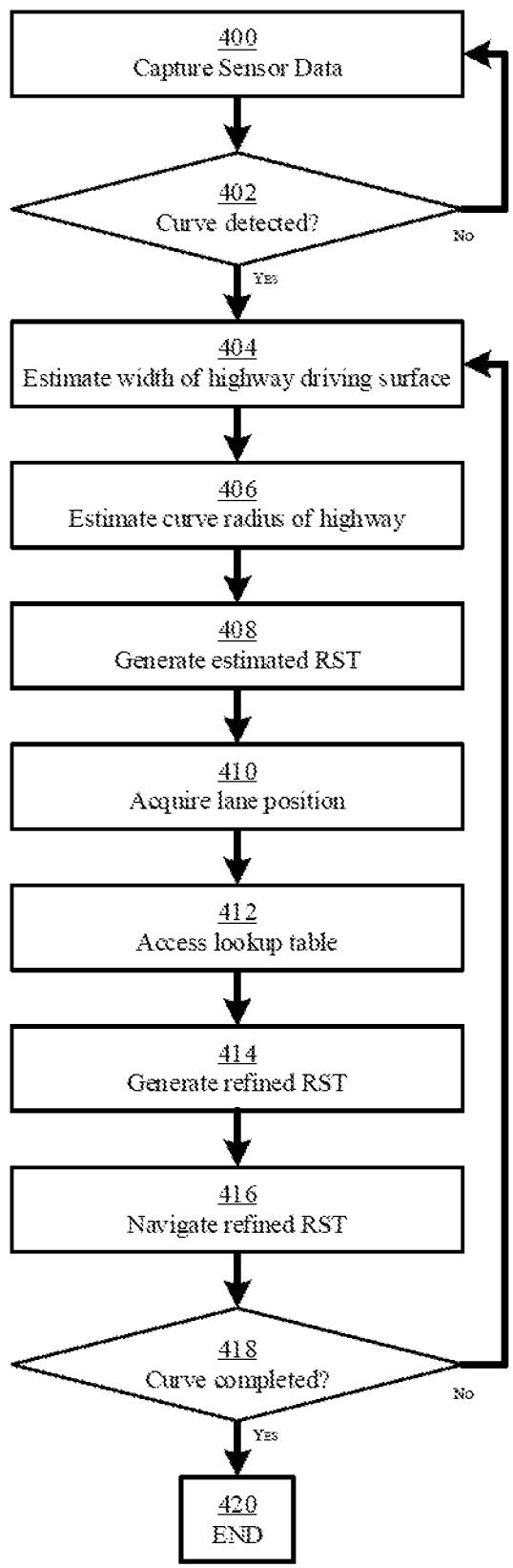
FIG. 4 is a flowchart illustrating a method of generating a radar signature trace path on a curved segment of highway utilizing a lookup table.

FIG. 4 is a flowchart of a method to be followed by a processor, such as processor 101 (see FIG. 1) to control an ego vehicle having an autonomous function through a curved segment of highway. The ego vehicle traverses the curve by following a radar signature trace (RST) through the curve. An ideal RST though the curve would exhibit the most efficient path to traverse the curve without the vehicle driving outside of a lane boundary. The method utilizes sensor data and a lookup table to generate a refined RST for the ego vehicle to traverse.

The method begins at step 400, where the ego vehicle utilizes sensors to capture sensor data. In the depicted embodiment, the sensors comprise at least radar sensors providing stationary reflections (SR) indicating the position of stationary objects relative to the ego vehicle. Advantageously, the radar sensors may also provide moving reflections indicating the position and motion of moving objects relative to the ego vehicle. The ego vehicle may comprise other sensors providing other data, such as a global positioning system (GPS) sensor providing GPS data indicating a location of the ego vehicle. The ego vehicle may comprise additional sensors, such as optical sensors, camera sensors, lidar sensors, or other sensors known in the art without deviating from the teachings disclosed herein.

After collecting sensor data, the method proceeds to step 402, where the sensor data is analyzed to determine if a curve has been detected. If not, the method returns to step 400. If yes, then the method proceeds to step 404, where the sensor data is utilized to estimate the width of the highway's driving surface. The width of the driving surface may be estimated using SR data, but MR data, GPS data, or other data may be utilized to improve the estimation. After the width of the driving surface has been estimated, the method proceeds to step 406, and the curve radius of the highway to be traversed is estimated.

After the curve radius of the highway is estimated at step 406, the method continues to step 408, where an estimated RST is generated. In other embodiments, this estimated RST may be utilized to traverse the curve, but in the current embodiment, the method seeks to refine this RST using previously-acquired knowledge presented in a lookup table. Thus, the method continues to step 410 where the lane position of the ego vehicle is acquired. For roadways having a single lane (or a single lane for the direction of travel of the ego vehicle), this step may comprise estimating the center of the portion of roadway accommodating the ego vehicle. For multi-lane roadways, a calculation of the number of lanes may be first required, with the relative position of the ego vehicle with respect to the SR data providing an estimation of which of the lanes of the determined number of lanes corresponding to the lane in which the ego vehicle is moving. In some embodiments, the calculation of the number of lanes may be based upon the estimated road width in view of road regulations. In some embodiments, the ego vehicle may utilize additional data, such as GPS data, to improve the accuracy of the lane position acquisition. For example, GPS coordinates of the ego vehicle may be compared to high-density map data indicating a number of lanes associated with the road at the GPS coordinates. Utilizing these coordinates may therefore improve the accuracy of the acquired lane position.

The method may then move to the next step 412, where the lookup table is accessed and the contents are compared to the acquired data for road width, curve radius, and lane position. The acquired data may additionally comprise a curvature direction for the turn of the road. All of this data may be compared to the lookup table, which comprises curvature data defining curved segments of highways. In some embodiments, historical SR data or historical MR data may be included within the curvature data, and may be compared to the captured data as well.

The curvature data may be utilized in the next step 414 where a refined RST is generated that corresponds to the curvature within the lookup table that most closely-resembles the data acquired and estimated thus far in the method. Once the refined RST has been generated, the method continues to step 416 where the ego vehicle navigates along the refined RST.

In the depicted embodiment, the method will next determine if the ego vehicle has successfully traversed the entirety of the curved segment of highway. If not, the method may return to step 404 and proceed through the method to generate an additional refined RST for the additional length of the curved segment. If the curve has been completed, the method may end at step 420. In other embodiments, instead of terminating the method, the method may instead return to step 400 (not shown) until another curve is detected by the sensor data.

The lookup table of the method may comprise a collection of curvature data defining curves according to known curved segments of highway. In the depicted embodiment, the lookup table may be populated with a known set of data points describing the known curved segments of highway. These data may have been acquired by extrapolating from road-building regulations. In the depicted embodiment, these data may additionally have been acquired using historical data, such as real-world measurements of curve radius and road width. In such embodiments, the historical data may additionally comprise historical SR data or MR data. In such embodiments, the road curvature data may have been acquired based upon other types of real-world measurements using other sensors, such as camera sensors, optical sensors, or lidar sensors.

The curvature data of the lookup table may comprise descriptions of RSTs corresponding to distinct lane positions, curve directions, or curve positions within the curved segment of highway. By way of example, and not limitation, the curve positions may be one of an entry or onset of the curve, a middle of the curve, and an egress or exit of the curve. These distinctions of curve positions may advantageously accommodate different RST trajectories with increased accuracy to maintain the ego vehicle within the legal boundaries of the road.

In some embodiments, the curvature data of the lookup table may be updated according to additional measurements of curved segments of highway in real time. By way of example, and not limitation, the curved segments of highway may be successfully traversed by an ego vehicle, and the ego vehicle may store the associated measurements and estimated data pertaining to the resulting RST in a memory. The memory may be local to the ego vehicle, such as memory 103 (see FIG. 1), or may be transmitted to an external memory wireless, such as by wireless transceiver 111 (see FIG. 1). Updates of the lookup table may be regularly scheduled, such as occurring after a set period of time or a set distance driven by an ego vehicle. Updates to the lookup table may be triggered by driving events, such as disengaging the prime mover of an ego vehicle when finished driving. Updates to the lookup table may occur continuously while driving. Other update conditions may be utilized by the ego vehicle without deviating from the teachings disclosed herein. Other ego vehicles may have access to the lookup table without deviating from the teachings within. In such embodiments, all the vehicles with access to the lookup table may form a fleet of vehicles, and some or all of the fleet may be configured to provide updates to the lookup table. In some embodiments, updates to the look up table may be provided by data entry from an authorized user of the system, such as via a data transfer or manual input of curvature data, without deviating from the teachings disclosed herein.

FIG. 5 provides an example of data found within a lookup table, such as the lookup table utilized in the method of FIG. 4. In the depicted embodiment, it is shown that the curvature data defines a curve radius, a lane position of the ego vehicle, a curve direction, a curve position, and distances to a left boundary and a right boundary. The left boundary and right boundary may comprise lane boundaries, or legal boundaries for the road surface (e.g., the shoulder, or a lane servicing oncoming traffic). In the depicted embodiment, the curvature data may be defined to describe rightmost or leftmost lane positions, but other data may describe other lane positions without deviating from the teachings disclosed herein. In the depicted embodiment, the curvature data may be defined to describe positions within the curve, such as a curve-entry; a curve-middle, or curve-egress, but other embodiments may comprise additional curve positions without deviating from the teachings disclosed herein.

Lookup table refinement may advantageously be simple and inexpensive to implement, but are heavily dependent upon the quality of data provided by the lookup table, and improvements to the RST refinement are relatively static between updates of the lookup table. Other embodiments may utilize machine learning techniques to provide faster improvement of the RST generation.

Figure 6:
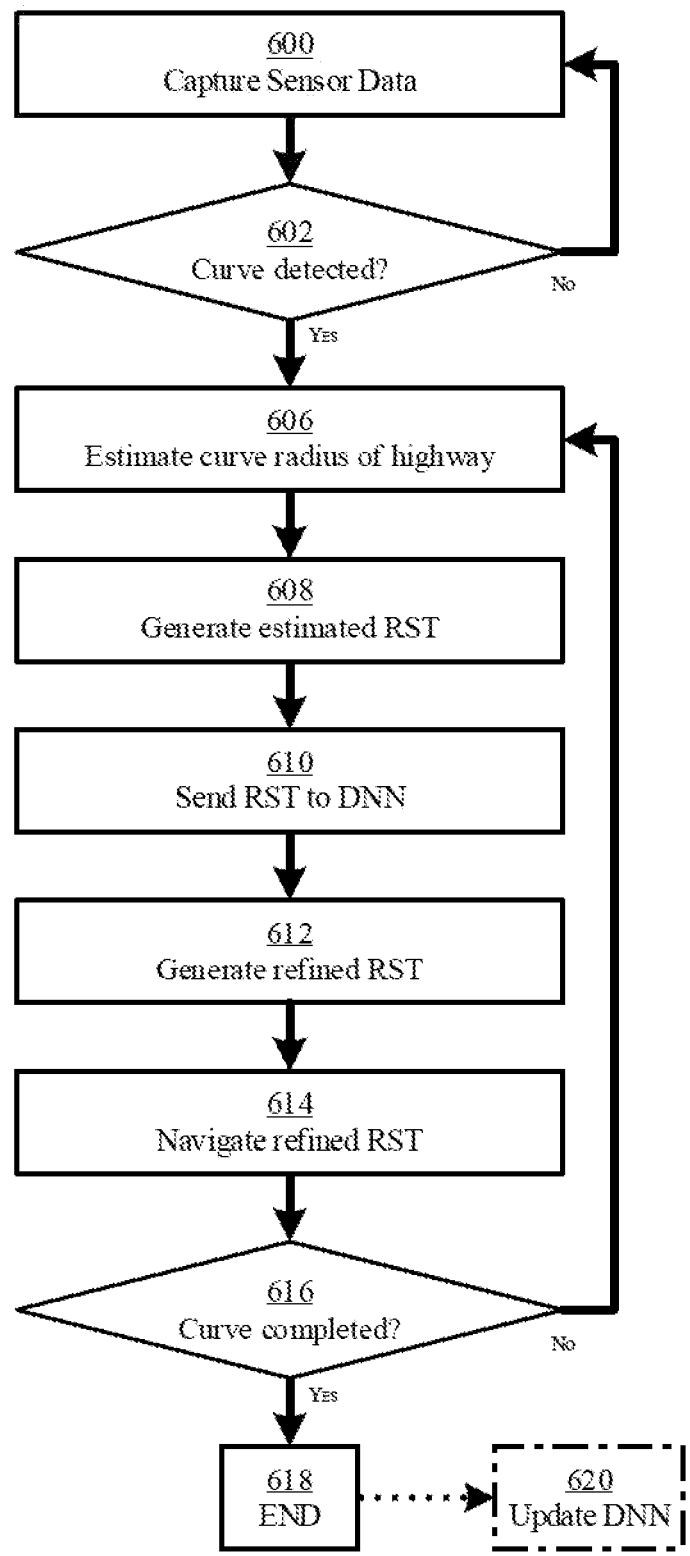
FIG. 6 is a flowchart illustrating a method of generating a radar signature trace path on a curved segment of highway utilizing a deep neural network.

FIG. 6 is a flowchart of a method to be followed by a processor, such as processor 101 (see FIG. 1) to control an ego vehicle having an autonomous function through a curved segment of highway. The ego vehicle traverses the curve by following a radar signature trace (RST) through the curve. An ideal RST though the curve would exhibit the most efficient path to traverse the curve without the vehicle driving outside of a lane boundary. The method utilizes sensor data and a machine learning techniques to generate a refined RST for the ego vehicle to traverse. In the depicted embodiment, the machine learning technique utilized may comprise a deep neural network (DNN).

The method begins at step 600, where the ego vehicle utilizes sensors to capture sensor data. In the depicted embodiment, the sensors comprise at least radar sensors providing stationary reflections (SR) indicating the position of stationary objects relative to the ego vehicle. Advantageously, the radar sensors may also provide moving reflections indicating the position and motion of moving objects relative to the ego vehicle. The ego vehicle may comprise other sensors providing other data, such as a global positioning system (GPS) sensor providing GPS data indicating a location of the ego vehicle. The ego vehicle may comprise additional sensors, such as optical sensors, camera sensors, lidar sensors, or other sensors known in the art without deviating from the teachings disclosed herein.

After collecting sensor data, the method proceeds to step 602, where the sensor data is analyzed to determine if a curve has been detected. If not, the method returns to step 600. If yes, then the method proceeds to step 604, where the sensor data is utilized to estimate the width of the highway's driving surface. The width of the driving surface may be estimated using SR data, but MR data, GPS data, or other data may be utilized to improve the estimation. After the width of the driving surface has been estimated, the method proceeds to step 606, and the curve radius of the highway is estimated.

After the curve radius of the highway is estimated, the method proceeds to step 608 which generates an estimated RST. In the depicted embodiment, the estimated RST may be generated based upon the road width and the cure radius. Other data, such as SR data or GPS data may be utilized to improve the accuracy of the estimated RST. In some embodiments, the estimated RST may be generated in view of received MR data.

Once an estimated RST is generated, the method proceeds to step 610 and the estimated RST is sent to a deep neural network (DNN) for analysis. The DNN may be trained on historical RST data and boundary data that is known to correlate to real-world curved segments of highway. The estimated RST may be analyzed by the DNN to generate lane estimations in real-time. Using these lane estimations, a refined RST may be generated at step 612 that optimizes the trajectory through the curved segment of highway. The optimized refined RST may be generated such that it would cause an ego vehicle to traverse the curve as efficiently as possible without travelling outside the lane boundaries. This refined RST having optimal characteristics is used to navigate the ego vehicle at step 614. After the navigation has occurred with the RST traversal, the method proceeds to step 616 where a determination is made as to whether the curve of the highway has been completely traversed. If not, the method may return to step 606. If the curve has been traversed, the method may proceed to step 618 to end.

An advantage of a deep neural network over other methods of refinement is that the DNN may be updated in response to successful completions of the method. Such updates provide a form of continual training and refinement of the DNN over time to better reflect real-world conditions encountered by vehicles. In the depicted embodiment, an optional step 620 may be performed after the completion of a curve, wherein the DNN is updated using some or all of the data measured, acquired, or estimated earlier in the method. The data utilized to update the DNN may vary depending on the exact configuration of the DNN. However, some embodiments of the invention may utilize some or all of the SR data, MR data, GPS data estimated RST, and refined RST to update the DNN. In some embodiments, the DNN may weight the additional data in the real-time training to fine-tune its response in a manner desired for optimized results. This weighting may give additional weight to more recent data acquired, or to refined RSTs that prove to have a high degree of success staying in the center of a lane. Other weighting schemes recognized by those of ordinary skill may be utilized without deviating from the teachings disclosed herein.

In some embodiments, additional data may be utilized to train the DNN. For example, an ego vehicle having camera sensors (such as camera sensors 107; see FIG. 1) may provide sensor data indicating the exact lane boundaries of the road, and this additional data may be used to track the accuracy of the refined RSTs. In some embodiments, a plurality of ego vehicles may be in wireless communication with the DNN, and the DNN may be updated rising data provided by some or all of the vehicles without deviating from the teachings disclosed herein. Such embodiments can advantageously improve their refinement very rapidly because of the high volume of data provided over time to continuously train and update the DNN.

Figure 7:
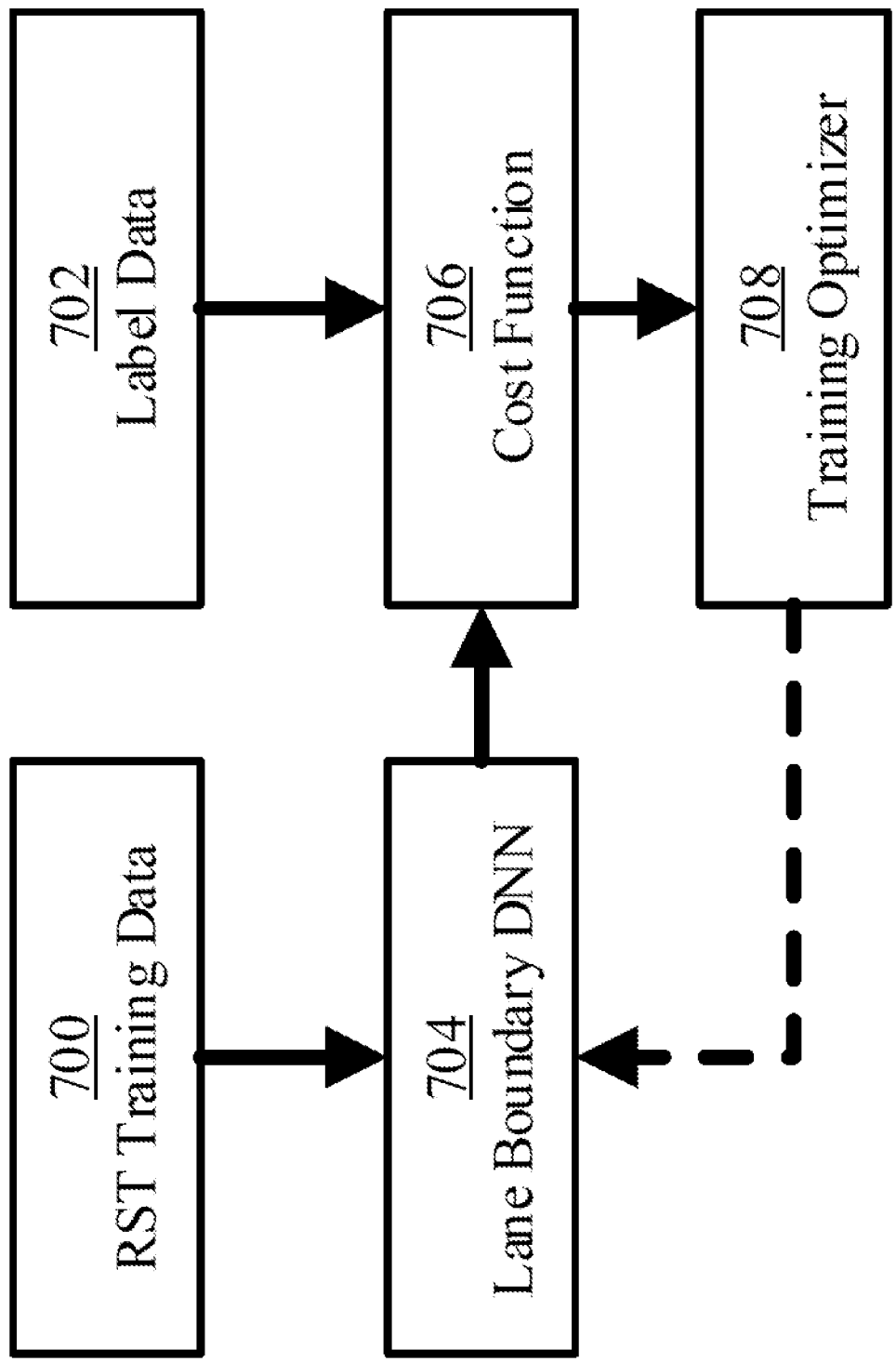
FIG. 7 is a flowchart illustrating a method for training a deep neural network useful for generating a radar signature trace path on a curved segment of highway.

Before the DNN can be utilized to generate a refined RST, it must first be trained to recognize and refine RSTs using frown data. FIG. 7 shows a flowchart illustrating a training phase for the DNN that may be utilized prior to implementation. The training phase relies upon two inputs: a first step of the training phase 700 provides a set of RST training data, and a second step 702 provides a corresponding set of label data. The RST training data may a corpus of sample RST curvature data, but in some embodiments may additionally comprise SR data or MR data if the DNN is configured to generate an initial estimated RST. The label data of step 702 comprises data indicating road boundaries and lane boundaries that are known to accurately reflect the desired estimations of the DNN when provided with the corresponding RST training data. In the depicted embodiment, the label data may comprise data acquired from optical sensors, such as camera sensors 105 (see FIG. 1). In some embodiments, the label data may not be derived from sensor measurements, and may instead be input by hand or from a corpus of pre-selected data known to be an accurate representation of curved segments of highways.

In the depicted embodiment, it is preferable for the RST training data in step 700 and corresponding label data in step 702 to represent a variety of expected road conditions and configurations. Curved segments of roads having different curve radii, road widths, number of lanes, and curve directions can advantageously train the resulting DNN to be adaptable to a wide variety of real-world conditions.

At step 704, the RST training data is provided to the deep neural network for assessment and estimation of the lane boundaries corresponding to the RST training data. After training, the estimated lane boundaries can be utilized to generate refined RSTs by interpolating the mid-points of a lane in which an ego vehicle is traveling as it traverses through a curved segment of highway. For this reason, it is desirable for the DNN to generate estimated boundary data that is as accurate to the real-world conditions as possible. Thus, the DNN at step 704 generates estimated boundary data that is compared to the label data of step 702 in comparison with a cost function at step 706. In the depicted embodiment, the estimated lane boundaries are optimized when the cost function yields a minimum cost in the comparison. After a cost has been generated, a training optimizer at step 708 may adjust the operations of the DNN for any portion of the estimated boundary data that exhibits a cost above a threshold value when compared to the label data. The adjusted DNN is thus trained to minimize the cost for the lane estimations for each set of RST training data and corresponding boundary data. This process of estimation, comparison, and optimization may be continued until the results have been optimized for all RST training data and corresponding boundary data.

Other data may be utilized to further optimize the training effectiveness. In some such embodiments, the label data may additionally comprise SR data corresponding to the known boundaries. In such embodiments, the RST training data may additionally comprise SR training data that may be used by the DNN to estimate lane boundaries and generate refined RSTs. Such an approach may be advantageous because it does not necessarily rely exclusively on lane estimations to generate a refined RST, and may instead utilize the more reliably-measured SR data as an input as well.

In some embodiments, the RST training data may comprise MR training data, and the label data may additionally comprise a historical corpus of corresponding MR data. In such embodiments, the historical corpus of MR data may advantageously be utilized to further optimize the DNN by providing examples of how other vehicles may be observed to traverse curved segments of highways. Such examples may be utilized by the training optimizer of step 708 to train the DNN to recognize MR data as additional useable information in generated estimated lane boundaries or refined RSTs.

The different embodiments disclosed herein may provide different advantages in implementation for an ego vehicle. By way of example, and not limitation, the lookup table implementation may be inexpensive and fast to implement, whereas the deep neural network may be comparatively more accurate and improves faster over time. Some embodiments may comprise a hybrid approach to generating a refined RST without deviating from the teachings disclosed herein. Other embodiments may comprise other techniques in addition to one or more of a lookup table or a deep neural network to optimize the generation of a refined RST for an ego vehicle.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts. Such portions of highways having traffic moving at relatively constant speeds and generally in the same direction are ideal environments to utilize an RST 211 because of these regular and predictable behaviors.

What is claimed is:

1. A method for navigating a vehicle having an autonomous driving function through a curved segment of a highway, the method comprising:
   capturing sensor data from a sensor associated with the vehicle, the sensor data comprising stationary reflection (SR) data indicating stationary objects and moving reflection (MR) data indicating moving objects;
   estimating a width of a driving surface of the highway based on the SR data;
   estimating a curve radius of the highway based upon the sensor data and the width of the driving surface;
   generating an estimated radar signature trace (RST) indicating a traversal curve for the vehicle to navigate based upon the sensor data;
   acquiring global positioning system (GPS) coordinates for the vehicle;
   acquiring a lane count indicating the number of lanes on the highway based on the GPS coordinates and high-density map data;
   generating a lane position of the vehicle based upon the SR data and the lane count;
   generating a refined RST based upon the sensor data, lane position, curve radius, and a lookup table of road curvature data; and
   navigating the vehicle along the refined RST through the curved segment of the highway.

2. The method of claim 1, wherein the estimated RST comprises an estimated curve-entry, an estimated curve-middle, and an estimated curve-egress and the refined RST comprises a refined curve-entry, a refined curve-middle, and a refined curve-egress.

3. The method of claim 2, further comprising increasing a weight of the road curvature data corresponding to the refined RST in the lookup table upon completion of the navigating the vehicle along the refined RST.

4. The method of claim 1, wherein the high-density map data is delivered to the vehicle wirelessly from a remote data storage device.

5. The method of claim 1, wherein generating the refined RST further comprises acquiring historical MR data indicating previously-measured MR data corresponding to curved segments of highways having the same curve radius and generating the refined RST based upon the historical MR data.

6. The method of claim 5, further comprising adding the MR data to the historical MR data upon completion of the step of navigating the vehicle along the refined RST.

7. The method of claim 1, wherein the lookup table of curvature initially comprises road curvature data acquired from vehicles having a camera sensor.

8. A non-transitory computer-readable medium having instructions stored thereon that when executed by a processor associated with a vehicle having an autonomous driving function cause the processor to perform a method for navigating the vehicle through a curved segment of a highway, the method comprising:
capturing sensor data from a sensor associated with the vehicle, the sensor data comprising stationary reflection (SR) data indicating stationary objects and moving reflection (MR) data indicating moving objects;
estimating a width of a driving surface of the highway based on the SR data;
estimating a curve radius of the highway based upon the sensor data and the width of the driving surface;
generating an estimated radar signature trace (RST) indicating a traversal curve for the vehicle to navigate based upon the sensor data;
acquiring global positioning system (GPS) coordinates for the vehicle;
acquiring a lane count indicating the number of lanes on the highway based on the GPS coordinates and high-density map data;
generating a lane position of the vehicle based upon the SR data and the lane count;
generating a refined RST based upon the sensor data, lane position, curve radius, and a lookup table of road curvature data; and
navigating the vehicle along the refined RST through the curved segment of highway.

9. The non-transitory computer-readable medium of claim 8, wherein the estimated RST comprises an estimated curve-entry, an estimated curve-middle, and an estimated curve-egress and the refined RST comprises a refined curve-entry, a refined curve-middle, and a refined curve-egress.

10. The non-transitory computer-readable medium of claim 9, wherein the instructions further comprise adding the refined RST to the lookup table upon completion of the navigating the vehicle along the refined RST.

11. The non-transitory computer-readable medium of claim 8, wherein the generating the refined RST further comprises acquiring historical MR data indicating previously-measured MR data corresponding to curved segments of highway having the same curve radius and generating the refined RST based upon the historical MR data.

12. The non-transitory computer-readable medium of claim 11, wherein the instructions further comprise adding the MR data to the historical MR data upon completion of the step of navigating the vehicle along the refined RST.

13. The non-transitory computer-readable medium of claim 8, wherein the lookup table of curvature data is initially populated using a corpus of data acquired from vehicles having a camera sensor.

14. A vehicle navigation system associated with a vehicle having an autonomous driving function, the system comprising:
a radar sensor operable to capture sensor data associated with the vehicle, the sensor data comprising stationary reflection (SR) data indicating the location of stationary objects with respect to the vehicle and moving reflection (MR) data indicating the location of moving objects with respect to the vehicle;
a processor in data communication with the radar sensor;
a global positioning system (GPS) sensor associated with the vehicle and in data communication with the processor, the GPS sensor configured to generate GPS data associated with the vehicle; and
a memory in data communication with the processor,
wherein the processor is configured to execute instructions stored on the memory to navigate the vehicle through a curved segment of highway by estimating a width of a driving surface of the highway based on the SR data, estimating a curve radius of the highway based upon the sensor data and the width of the driving surface, generating an estimated radar signature trace (RST) based upon the sensor data, generating a lane position of the vehicle based upon the SR data, GPS data, and high-density map data representing highways, generating a refined RST based upon the sensor data, lane position, curve radius, and a lookup table of road curvature data stored on the memory, and navigating the vehicle along the refined RST of the extent of the curved segment of highway.

15. The system of claim 14, wherein the estimated RST comprises an estimated curve-entry, an estimated curve-middle, and an estimated curve-egress and the refined RST comprises a refined curve-entry, a refined curve-middle, and a refined curve-egress.

16. The system of claim 15, wherein the processor is furthers operable to add the refined RST to the lookup table upon completion of the navigating the vehicle along the refined RST.

17. The system of claim 14, further comprising a wireless transceiver associated with the vehicle and in data communication with the processor, and wherein the high-density map data is delivered from a remote data storage device via the wireless transceiver.

18. The system of claim 14, wherein processor is further operable to generate the refined RST by acquiring historical MR data indicating previously-measured MR data corresponding to curved segments of highway having the same curve radius and generating the refined RST based upon the historical MR data.

19. The system of claim 14, wherein the lookup table of curvature data is initially populated using a corpus of data acquired from vehicles having a camera sensor.

20. The system of claim 19, wherein the processor is further operable to add the refined RST to the lookup table upon completion of the navigating the vehicle along the refined RST.

* * * * *